United States Patent
Braude et al.

[15] 3,689,661
[45] Sept. 5, 1972

[54] REVERSIBLE AGGLOMERATION OF POWDERS FOR AERIAL DISSEMINATION

[72] Inventors: George L. Braude, Ellicott City, Md. 21043; Joseph A. Cogliano, Baltimore, Md. 21227

[73] Assignee: W. L. Grace & Co., New York, N.Y.

[22] Filed: Aug. 14, 1969

[21] Appl. No.: 850,238

[52] U.S. Cl. ............424/304, 71/105, 71/120.65, 424/16, 424/274, 424/300
[51] Int. Cl. .................................................A61j 3/02
[58] Field of Search .....71/105, 120.65; 424/304, 16, 424/274, 300

[56] References Cited

UNITED STATES PATENTS

| | | | |
|---|---|---|---|
| 2,306,434 | 12/1942 | Goodhue et al. | 21/58 |
| 2,657,164 | 10/1953 | Buntin | 424/192 |
| 3,250,798 | 5/1966 | Shulgin | 71/105 |
| 3,403,993 | 10/1968 | Hoff | 71/65 |
| 3,151,969 | 10/1964 | Stevens | 424/78 X |

FOREIGN PATENTS OR APPLICATIONS

| | | |
|---|---|---|
| 601,666 | 5/1948 | Great Britain |
| 609,073 | 9/1948 | Great Britain |
| 1,010,191 | 11/1965 | Great Britain |
| 839,352 | 5/1952 | Germany |
| 1,155,631 | 5/1964 | Germany |

OTHER PUBLICATIONS

Sullivan et al., J. Econ. Entomol. 34: 79– 80, 650– 653 (1941)
Goodhue et al., J. Econ. Entomol. 35: 533– 536 (1942)
Hildreth, Chem. Abst. 42: 2050b (1948)
Mayer, Chem. Abst. 47: 12745b (1953)

*Primary Examiner*—Shep K. Rose
*Attorney*—Kenneth E. Prince

[57] ABSTRACT

Powders are agglomerated by solid binders that vaporize when the agglomerates are aerially dispersed from an airplane, a specially-equipped dissemination vehicle (truck), etc. The biologically active powders are then available in their original particle size. The powders can be, for example, a pesticide, etc.

4 Claims, No Drawings

REVERSIBLE AGGLOMERATION OF POWDERS FOR AERIAL DISSEMINATION

BACKGROUND OF THE INVENTION

1. Object of the Invention

An object of this invention is to provide an improved method for aerially disseminating fine powders, such as agricultural pesticides, herbicides and other toxic materials, from airplanes, trucks, etc. Other objects will be apparent to those skilled in the art.

2. Prior Art

For some pesticides to be effective, a fine particle dispersion is required. Herbicides or pesticides should also consist of fine particles for even distribution onto plants. When attempting to disseminate such materials from low-flying aircraft or helicopters, considerable wind drifting of the fine particles occurs which makes it difficult to precisely cover the target areas. This drifting is caused by the wind blowing the fine particles over a distance determined by the wind velocity and the length of time in the air. Fine particles settle very slowly. Solid agent powder dissemination equipment has been developed, but to achieve reasonable target effectiveness at high wind velocities or turbulence, the airplane or helicopter must fly at a very low altitude.

BROAD DESCRIPTION OF THE INVENTION

The process of this invention involves agglomerating fine particles, which have a mean particle diameter between 0.01 micron and 1 millimeter and which are biologically active, by means of a solid, volatile binding material into agglomerates having a means particle diameter between 0.5 microns and 2 centimeters. The agglomerates can be stored under conditions which keep the binding material (binder) in the solid state until they are used. The agglomerates are accurately aerially disseminated onto target areas, whereupon the binding material vaporizes and the fine particles in the agglomerates are dispersed as individual particles. An additional advantage of this process is the elimination of dusting problems prevalent with fine particle products when they are disseminated, handled, etc.

An important consideration is the ready reaerosolizability and disintegration of the pellets. To achieve ready reaerosolizability and provide for a uniform distribution and coverage of the desired target areas by the product requires a fine particle relatively free of agglomerates or aggregates. It was found that the method of this invention does not change the reaerosolizability of the original material, and that photomicrographs prepared of the powders before treatment, and after agglomeration and redispersion show similar size particles.

The invention also includes an article of manufacture which are agglomerates having a mean particle diameter between 0.5 microns and 2 centimeters. The agglomerates are comprised of fine particles having a mean particle diameter between 0.01 micron and 1 millimeter and a solid, volatile binder. The fine particles incorporated into the agglomerates are biologically active.

DETAILED DESCRIPTION OF THE INVENTION

The fine particles to be dispersed are preferably spherical in shape, but can have essentially any shape. The mean particle size of the particles can range between 0.01 micron and 1.0 millimeter, although preferably between 1 and 10 microns. The fine particles are biologically active in some manner, for example, may act as fungicides, herbicides, pesticides, bactericides, etc., may effect vegetation e.g., be a defoliant, etc.), and so forth. The fine particles to be dispersed can be, for example, a pesticide, a herbicide, etc.. Specific examples are 3-( 3,4-dichlorophenyl)-1,1-dimethylurea ("Darmex," a herbicide), 1-napthyl N-methyl-carbamate ("Seria," a systemic insecticide), N-trichloromethylthio-4-cyclohexene-1,2-dicarboximide ("Captan," a fungicide), the reaction product of $NCCH_2CN$ and chlorobenzaldehyde, and hydrophobic form of the immediately aforegoing reaction product.

The binding materials must be solid and volatile (preferably at room temperature), and can be organic or inorganic. The term "solid" includes gelled, congealed, coagulated, etc. Examples of useful binding materials, having relatively low melting or sublimation points, are: camphor; p-dichlorobenzene; naphthalene; trioxane; ammonium carbamate; 1,6-dichloronaphthalene; 1,4-naphthoquinone; 5-chloro-2-nitrophenol; 2,4-diiodophenol; 2,4,6-tribromophenol; polyoxyvaleric acid; o-xyloquinone; p-xyloquinone; $\beta$-sulfur trioxide; 2-phenylchromone; dicyclopentadiene; p-bromoanisole; 4-methoxy-3-ethoxybenzaldehyde; $\alpha$-chloroacrylic acid; and solid $CO_2$. Between 0.1 and 80 percent by weight of the binding material (based upon the weight of the fine particles used) are used, but preferably between 5 and 20 percent by weight of the binder is utilized.

The binding material must be volatile (or sublime) to a reasonable extent at the temperatures encountered in the redispersing stage, which will be a maximum temperature of about 120° F. The binding material should not be so volatile at normal storage conditions that a problem occurs, but this problem can be alleviated by storing the agglomerates in sealed containers, with the option of pressurizing the containers. Or, any storage and transportation of the agglomerates can be done under an atmosphere saturated with the vapors of the binder. Another binding method is solid $CO_2$ which is injected into a stream of flowing particles. If low temperatures are available, a small amount of water, which is frozen by the dry $CO_2$ to ice, provides an effective agglomerating medium. A cyclone device should be used in that agglomerating scheme.

The agglomerates should have a mean size (diameter) between 0.5 micron and 2 centimeters. Agglomerates in the preferred diameter range usually fall to earth in less than about a minute from heights of one thousand feet and have minimal wind drift rates. Each agglomerate can include two or more of the individual particles. The agglomerates must be capable of storage and handling, but must disintegrate readily after exposure to air. The agglomerate life in open air is normally a few minutes, but can be several days in particular embodiments. That life span depends upon the method and pressure used to form the agglomerates, the type and amount of binder used, etc.

The particles in the agglomerates need to be maintained in a loosely packed form to be easily reversible, i.e., reaerosolization by essentially spontaneous means. Therefore, agglomerate preparation should not be done by using very high compression, such as by forming pellets or by tableting under relatively high pressure. Various agglomeration or pelletizing techniques may be used provided that the force or pressure used is small so as to prevent an excessively close contact between the original particles. Examples of useful techniques include pan granulating, extrusion, pelleting, cyclone agglomerating, prilling, use of vibrators, etc. When the agglomerates are prepared by pelletizing the fine particles, it can be accomplished at room temperature or, preferably, by maintaining the equipment and particles above the softening temperature of the binder. Gas pressure may be applied to prevent vaporization of the binder. The agglomerates are then cooled to prevent a breaking up thereof. Grinding may be necessary. If the agglomerating is done by merely admixing the particles and binder, it may be desirable to incorporate the binder dissolved in a small amount of volatile solvent, e.g., pentane. Large amounts of volatile solvent cannot be used because an irreversible agglomeration may be produced. Or, it may be desirable to grind the blend.

The agglomerates are normally stored in protective containers, free from exposure to air. Pressure and special gases may be used during storage. Normally, the agglomerates are stored in an atmosphere saturated with vapors of the substance used as a binder. The agglomerates, so stored, should not cake into large solids, even when subjected to temperature cycling. The term "store" or "storing," as used herein, can encompass a very short time and can encompass periods of time which are essentially transportation periods.

To achieve an easier reaerosolization, the original particles should preferably be protected against permanent agglomeration by a suitable treatment. Such treatments, which are well known in the art, may include impregnation with a silicone or silazane with or without addition of fine size hydrophobic silica, to make the particles more hydrophobic as shown in U.S. Pat. No. 3,333,776 the pertinent portions of which are specifically incorporated herein by reference.

The agglomerated particles are normally taken aloft to the desired location in suitable dissemination equipment or containers by airplanes or helicopters. The agglomerates are then dropped, either all at once or at the desired stream rate, and fall rapidly to the ground. The dropped agglomerates disintegrate by evaporation of the binder during the fall or after impact on the ground, trees, foliage, etc. After evaporation of the binder, the particles should not still be agglomerated to any significant degree.

The term "aerial dissemination," as used herein, means dispersion from an airplane, a projectile, a ground vehicle, etc. The term "airplane," as used herein, includes helicopters, airplanes, dirigibles, balloons, and any other craft capable of air flight. The agglomerated particles may be taken aloft to the desired height in suitable dissemination equipment or containers by airplanes or helicopters. They may also be disseminated by being blown or projected from ground vehicles in continuous streams or batchwise onto the area to be covered. When taken aloft by airplanes, they may then be dropped, either all at once or at the desired stream laid, and will fall rapidly to the ground.

The term ground vehicle used herein may imply a tractor, truck, or other vehicle capable of moving through or to the desired location. The agglomerated particles may be disseminated from these vehicles by means of blower devices or throwing devices, and by use of, for instance, centrifugal force or similar means.

EXAMPLE 1

One thousand grams (powdered) of the reaction product of $NCCH_2CN$ and chlorobenzaldehyde, 700 milliliters of Skelly F solvent, 30 grams of "Cabosil SH-5" ( a fine size silica made by the Cabot Company) and 10 grams of hexamethyldisilazane were ball milled together for over 48 hours. The balls were removed on a screen and the paste dried overnight, yielding a free flowing powder of treated reaction product of $NCCH_2CN$ and chlorobenzaldehyde with a mean particle diameter of 6 microns.

EXAMPLE 2

Ten grams of the treated reaction product of $NCCH_2CN$ and chlorobenzaldehyde described in Example 1 were admixed with 0.50 gram of camphor. The mixture was ground in a Waring Blendor. The resulting powder was compressed to small pellets of about 4 millimeter in diameter. The resulting agglomerates could be handled readily without disintegrating into the original particles. The pellets were then dropped from a height of 30 feet onto (a) a concrete surface and (b) shrubbery. Part of the pellets disintegrated on impact, and the balance of the pellets yielded finely powdered reaction product of $NCCH_2CN$ and chlorobenzaldehyde within 30 minutes, the camphor binder having completely evaporated. The particles obtained from the disintegrated pellets were free flowing, easily reaerosolized, and had a mean particle diameter of 6 microns, like the pretested reaction product of $NCCH_2CN$ and chlorobenzaldehyde used for agglomerating.

EXAMPLE 3

Ten grams of the pretreated reaction product of $NCCH_2CN$ and chlorobenzaldehyde from Example 1 were admixed with 0.3 gram of paradichlorobenzene in 2.0 milliliter of pentane. After thorough mixing in a mortar, pellets were formed in a small tableting machine under low pressure. The agglomerates were about 6 millimeters in diameter and 3 millimeters thick, and were resistant to breakage and disintegration. The tablets were exposed to ambient air for 18 hours. Both the solvent and the solid binding agent evaporated, yielding a free flowing readily aerosolizable product.

Photomicrographs taken of the particles of reaction product of $NCCH_2CN$ and chlorobenzaldehyde before and after addition of the paradichlorobenzene and solvent and agglomeration showed no difference in particle size (which averaged about 6 microns) or of degrees of agglomeration.

EXAMPLE 4

A small laboratory cyclone device was connected to a carbon dioxide cylinder. An inlet tube was provided into the cyclone through which pretreated reaction product of $NCCH_2CN$ and chlorobenzaldehyde in air was fed continuously from a funnel. Introducing the carbon dioxide rapidly and a small stream of reaction product of NCCH$_2$CN and chlorobenzaldehyde simultaneously into the cyclone resulted in a rapid cooling of the cyclone device due to the expansion of the carbon dioxide. The exit stream from the cyclone yielded the reaction product of NCCH$_2$CN and chlorobenzaldehyde particles which were agglomerated to spherical balls of about 3 millimeters in diameter. These balls, it is believed, were held together by frozen moisture introduced with the air. The particles did not change in appearance on storage in a freezer at 0° to 5° F. overnight. On exposure to air at ambient temperature, rapid disintegration occurred, yielding a free flowing readily reaerosilizable reaction product of NCCH$_2$CN and chlorobenzaldehyde powder.

EXAMPLE 5

5grams of the reaction product of NCCH$_2$CN and chlorobenzaldehyde, having a mean particle diameter of 6 microns, and 10 grams of powdered dry ice were admixed. The resultant agglomerates were about 1 millimeter in diameter. Some moisture absorbed from the air formed a crust around the agglomerates. The ice melted and the dry ice sublimed off in about 30 minutes. The particles of the reaction product of NCCH$_2$CN and chlorobenzaldehyde were free flowing. The experiment was repeated and the agglomerates were dropped about 30 feet, yielding a finely powdered reaction product of NCCH$_2$CN and chlorobenzaldehyde on impact.

EXAMPLE 6

10 grams of the reaction product of NCCH$_2$CN and chlorobenzaldehyde, having a mean particle size of 6 microns and 1 gram of para-dichlorobenzene were admixed and peletized. The para-dichlorobenzene vaporized off within 2 days and the reaction product of NCCH$_2$CN and chlorobenzaldehyde was free flowing.

EXAMPLE 7

Example 2 was repeated, except that the camphor was admixed with a very small amount of pentane before the camphor was admixed with the reaction product of NCCH$_2$CN and chlorobenzaldehyde. The pentane immediately vaporized off. Similar results were obtained.

EXAMPLE 8

Example 2 was repeated, except that 10 gram of "-Captan" were used in place of the reaction product of NCCH$_2$CN and chlorobenzaldehyde prepared in Example 1. Similar results were obtained.

EXAMPLES 9 thru 13

Example 6 was repeated five times, except that the para-dichlorobenzene was replaced with ammonium carbamate, trioxane, naphthalene, polyoxyvaleric acid, and β-sulfur trioxide, respectively. Agglomerates were obtained in each case and the reaction product of NCCH$_2$CN and chlorobenzaldehyde was free flowing in each case after the binder had vaporized (or sublimed) off.

EXAMPLE 14

Example 2 was repeated, except that the agglomerates were stored under an atmosphere saturated with camphor vapors. Similar results were obtained.

EXAMPLE 15

Example 2 was repeated, except that 20 gram of "-Carmex" were used in place of the reaction product of NCCH$_2$CN and chlorobenzaldehyde prepared in Example 1. Similar results were obtained.

EXAMPLE 16

Example 2 was repeated, except that 7 gram of "-Serin" were used in place of the reaction product of NCCH$_2$CN and chlorobenzaldehyde prepared in Example 1. Similar results were obtained.

EXAMPLES 16 thru 21

Example 2 was repeated five times, except that the camphor was replaced with ammonium carbamate, trioxane, naphthalene, polyoxyvaleric acid, and β-sulfur trioxide, respectively. Agglomerates were obtained in each case and the reaction product of NCCH$_2$CN and chlorobenzaldehyde was free flowing in each case after the binder had vaporized (or sublimed) off.

EXAMPLE 22

200 ml. of a mixture of saturated hydrocarbons having an average of about 6 carbon atoms per molecule (Skelly "F" solvent), 3 grams of a finely divided silica having a surface area of 325 square meters per gram and 0.5 gram of hexamethyldisilazane were admixed. the admixture was placed in a U.S. Stonewarde BF-00. 0.3 gal capacity, ball-mill jar and milled for 15 minutes to insure treatment of the silica and grinding surfaces of the mill with the silazane. 100 grams of the pulverized reaction product of NCCH$_2$CN and chlorobenzaldehyde was added to the mixture to form a slurry. The slurry was milled for 24 hours. The slurry was then removed from the mill and the hydrocarbon fluidizing agent allowed to evaporate. The product was a soft cake. It was disintegrated by dry-grinding in a ball mill similar to the one above for 15 minutes to yield a free-flowing powder with 98 percent of its particles smaller than 5 microns, and essentially all of its particles smaller than 10 microns. 10 grams of the ground product was treated by the method of Example 2 and similar results were obtained.

What is claimed:

1. Pellets having minimal wind drift rates for accurately disseminating fine readily re-aerosolizable powders onto target areas, said pellets having a mean particle diameter between 0.5 micron and 2 centimeters and consisting essentially of bilogically active fine aerosolizable particles having a mean particle diameter between 0.01 micron and 1.0 millimeter selected from the group consisting of 3-(3,4-dichlorophenyl)-1,1-dimethylurea, 1-naphthyl N-methyl-carbamate, N-trichloromethylthio-4-cyclohexene-1,2-dicarboximide, and the reaction product of NCCH$_2$CH and chlorobenzaldehyde agglomerated together with an effective amount of a solid, volatile binder to maintain a loosely packed form adapted to essentially spontaneously reaerosolize said biologically active particles, said binder being selected from the group consisting of camphor; p-dichlorobenzene, naphthalene, trioxane; ammonium carbamate; 1,6-dichloronaphthalene, 1,4-naphthoquinone; 5-chloro-2-nitrophenol; 2,4-diiodophenol; 2,4,6-tribromophenol; polyoxyvaleric acid; o-xyloquinone; p-xyloquinone; -sulfur trioxide; 2-phenylchromone; dicyclopentadiene; p-bromoanisole; 4-methoxy-3-ethoxybenzaldehyde; -chloroacrylic acid; and solid $CO_2$, said pellets being adapted for disintegration by volatilization of the binder during the fall to the ground as well as upon impact on a target area, said biologically active fine particles being readily re-aerosolizable and not in agglomerated form to any significant degree after volatilization of the binder.

2. An article of manufacture as described in claim 1 wherein said binder is camphor.

3. An article of manufacture as described in claim 1 wherein said binder is para-dichlorobenzene.

4. An article of manufacture as described in claim 1 wherein said fine particles are the reaction product of $NCCH_2CN$ and chlorobenzaldehyde.

* * * * *